(12) United States Patent
Wu et al.

(10) Patent No.: US 10,561,275 B2
(45) Date of Patent: Feb. 18, 2020

(54) COOKING DEVICE

(71) Applicant: Tsann Kuen (Zhangzhou) Enterprise Co., Ltd., Zhangzhou, Fujian (CN)

(72) Inventors: Chunyu Wu, Fujian (CN); Jiankun Wu, Fujian (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 295 days.

(21) Appl. No.: 14/740,003

(22) Filed: Jun. 15, 2015

(65) Prior Publication Data

US 2015/0366402 A1 Dec. 24, 2015

(30) Foreign Application Priority Data

Jun. 23, 2014 (CN) .......................... 2014 1 0284829

(51) Int. Cl.
  *A47J 37/06* (2006.01)
  *A47J 36/16* (2006.01)
(52) U.S. Cl.
  CPC ........... *A47J 37/0611* (2013.01); *A47J 36/16* (2013.01); *A47J 37/0629* (2013.01)
(58) Field of Classification Search
  CPC ..... A47J 37/0611; A47J 36/16; A47J 37/0629
  USPC .......................................... 99/372–380, 340
  See application file for complete search history.

(56) References Cited

U.S. PATENT DOCUMENTS

| | | | |
|---|---|---|---|
| 6,170,389 B1* | 1/2001 | Brady | A47J 37/0611 219/386 |
| 6,363,839 B1* | 4/2002 | Wu | A47J 37/0611 99/375 |
| 2004/0217109 A1 | 11/2004 | Chang | |
| 2005/0247210 A1* | 11/2005 | Ragan | A47J 37/0611 99/372 |
| 2010/0319550 A1* | 12/2010 | Wu | A47J 37/0611 99/380 |
| 2014/0352553 A1 | 12/2014 | Guckenberger et al. | |
| 2015/0033953 A1* | 2/2015 | Fung | A47J 37/0611 99/377 |

OTHER PUBLICATIONS

Examination Report dated Nov. 20, 2018, issued in counterpart Australian Patent Application No. 2015203188.

* cited by examiner

*Primary Examiner* — Ibrahime A Abraham
*Assistant Examiner* — Biniam B Asmelash
(74) *Attorney, Agent, or Firm* — Brinks Gilson & Lione

(57) ABSTRACT

A cooking device includes a lower heating plate unit, an upper housing member, and at least one positioning mechanism that includes a lower coupling unit fixed to the lower heating plate unit, an upper coupling member fixed to the upper housing member, an actuating member disposed on the upper coupling member, and a pin connected to the upper coupling member. The cooking device further includes an upper heating plate coupled to the upper housing member. Removal of the upper heating plate results in the actuating member being pushed resiliently to have a positioning portion thereof engaging a guiding hole of the lower coupling unit, so that the upper housing member is limited to move to be parallel to and spaced apart from the lower heating plate unit.

9 Claims, 12 Drawing Sheets

COOKING DEVICE

CROSS-REFERENCE TO RELATED APPLICATION

This application claims priority of Chinese Patent Application No. 201410284829.9, filed on Jun. 23, 2014.

FIELD OF THE INVENTION

The invention relates to a cooking device, more particularly to a cooking device that can cook food with direct or indirect heating.

BACKGROUND OF THE INVENTION

A conventional cooking device includes a lower heating plate and an upper heat plate connected pivotally to the lower heating plate. Food would be placed on the lower heating plate, then the upper heat plate is moved to cover the lower heating plate for cooking the food with direct heating (e.g., grilling). However, the conventional cooking device generally cannot be used to cook food which should be cooked with indirect heating (e.g., baking). In other words, the conventional cooking device has a relatively low flexibility in cooking food.

SUMMARY OF THE INVENTION

Therefore, the object of the present invention is to provide a more versatile cooking device that can cook food with direct or indirect heating.

According to the present invention, there is provided a cooking device. The cooking device includes a lower heating plate unit including a lower heating mechanism, an upper housing member, an upper heating mechanism disposed in the upper housing member, at least one positioning mechanism and an upper heating plate. The upper housing member is connected to the lower heating plate unit, and is movable relative to the lower heating plate unit between a covering position to cover the lower heating plate unit, and an opening position to uncover the lower heating plate unit. The positioning mechanism includes a lower coupling unit, an upper coupling member, a connecting unit and a resilient member. The lower coupling unit is connected fixedly to the lower heating plate unit, and is formed with a guiding hole. The upper coupling member is connected fixedly to the upper housing member, and is formed with a first engaging unit. The connecting unit includes an actuating member and a pin having a shaft portion and a positioning portion. The shaft portion extends through the guiding hole of the lower coupling unit, and has one end connected co-movably to the upper coupling member. The positioning portion is connected to an opposite end of the shaft portion of the pin. The actuating member is disposed movably on the upper coupling member and connected fixedly to the end of said shaft portion of the pin. The resilient member interconnects the upper coupling member and the actuating member, and biases the actuating member toward the first engaging unit of the upper coupling member. The upper heating plate is coupled detachably to the upper housing member for enclosing the upper heating mechanism therebetween. The upper heating plate has a second engaging unit that engages removably the first engaging unit of the upper coupling member to push the actuating member away from the first engaging unit against a resilient force of the resilient member, thereby maintaining disengagement of the positioning portion of the pin from the guiding hole of the lower coupling unit during movement of the upper housing member between the covering and opening positions.

When the upper housing member is at the opening position, removal of the upper heating plate disengages the second engaging unit from the first engaging unit, such that the actuating member is pushed resiliently toward the first engaging unit, thereby moving the pin to have the positioning portion thereof engaging the guiding hole of the lower coupling unit, so that the upper housing member is limited to move toward the lower heating plate unit to a baking position, where the upper housing member is parallel and spaced apart from the lower heating plate unit.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
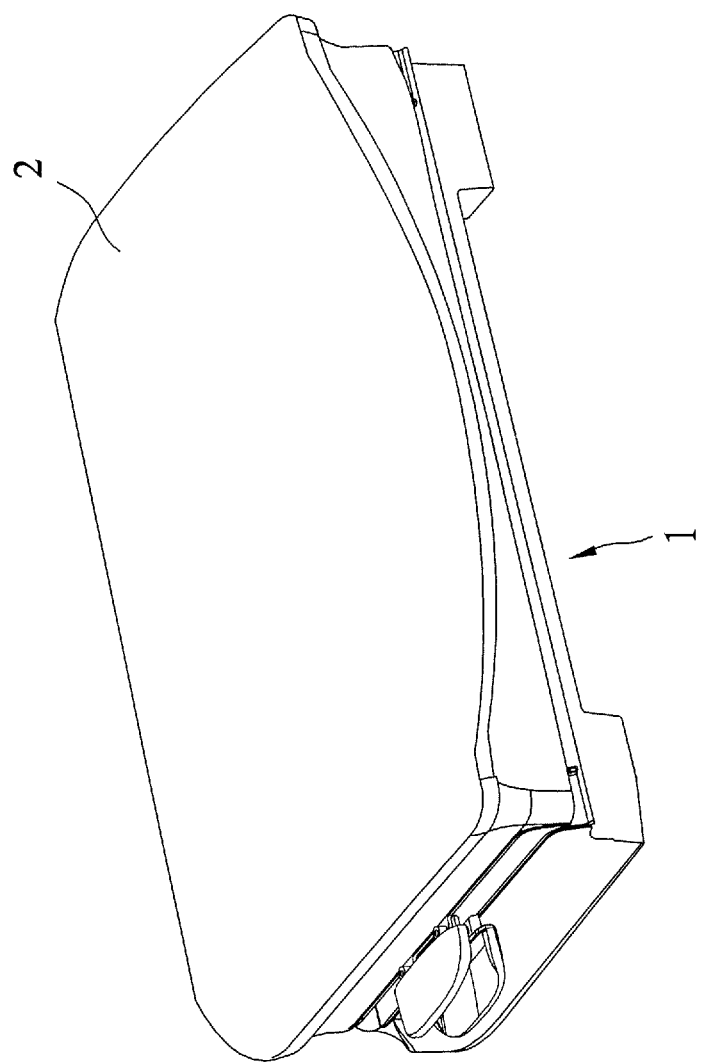
FIG. 1 is a perspective view of an embodiment of a cooking device according to the present invention with an upper housing member at a covering position.
Figure 2:
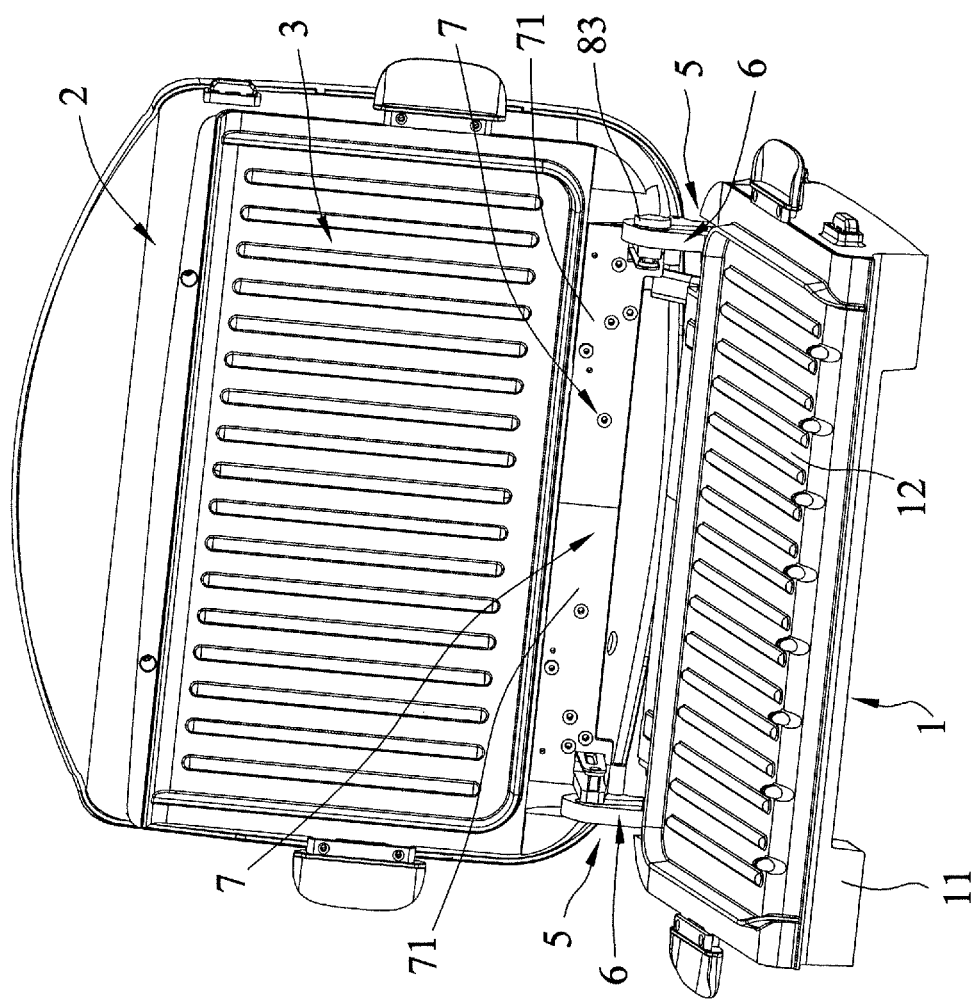
FIG. 2 is a perspective view of the embodiment with the upper housing member at an opening position.
Figure 3:
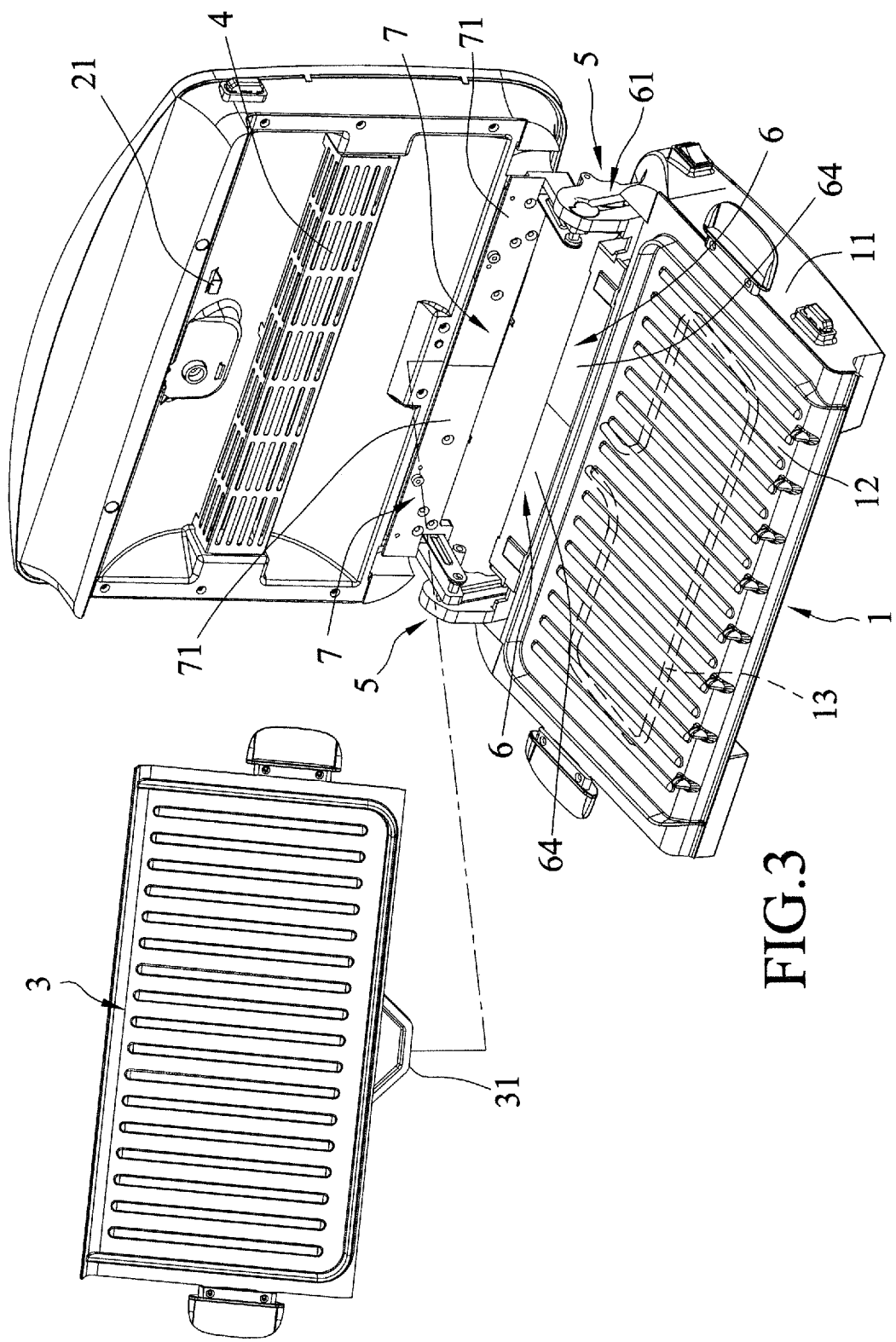
FIG. 3 is a partly exploded perspective view of the embodiment.
Figure 4:
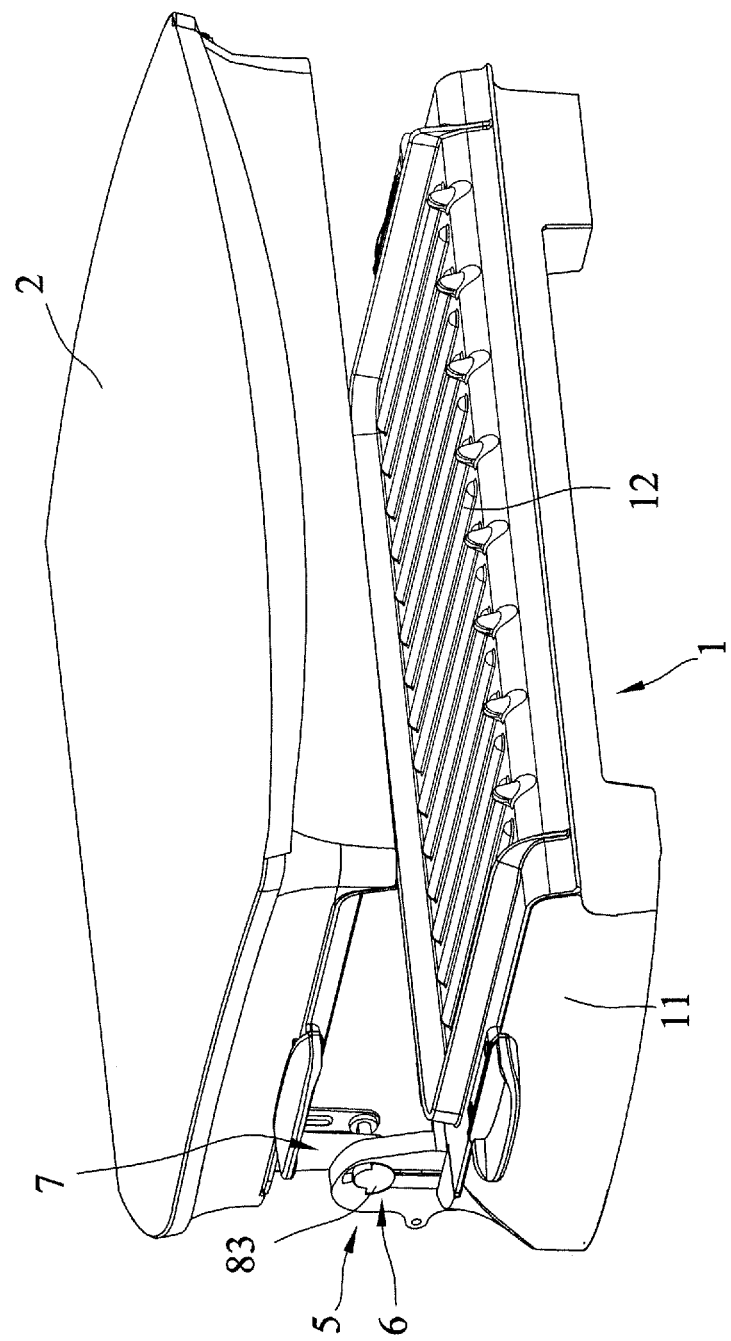
FIG. 4 is a perspective view of the embodiment with the upper housing member at a baking position.

Referring to FIGS. 1 to 4, an embodiment of a cooking device according to this invention includes a lower heating plate unit 1, an upper housing member 2 having a positioning hook 21, and two positioning mechanisms 5. The lower heating plate unit 1 includes a lower housing 11, a lower heating mechanism 13 disposed in the lower housing 11, and a lower heating plate 12 coupled to the lower housing 11 for enclosing the lower heating mechanism 13 therebetween. The two positioning mechanisms 5 are spaced apart from each other along a longitudinal direction of a side of the lower heating plate unit 1, and interconnect the lower heating plate unit 1 and the upper housing member 2. The cooking device further includes an upper heating mechanism 4 disposed in the upper housing member 2.

Figure 5:
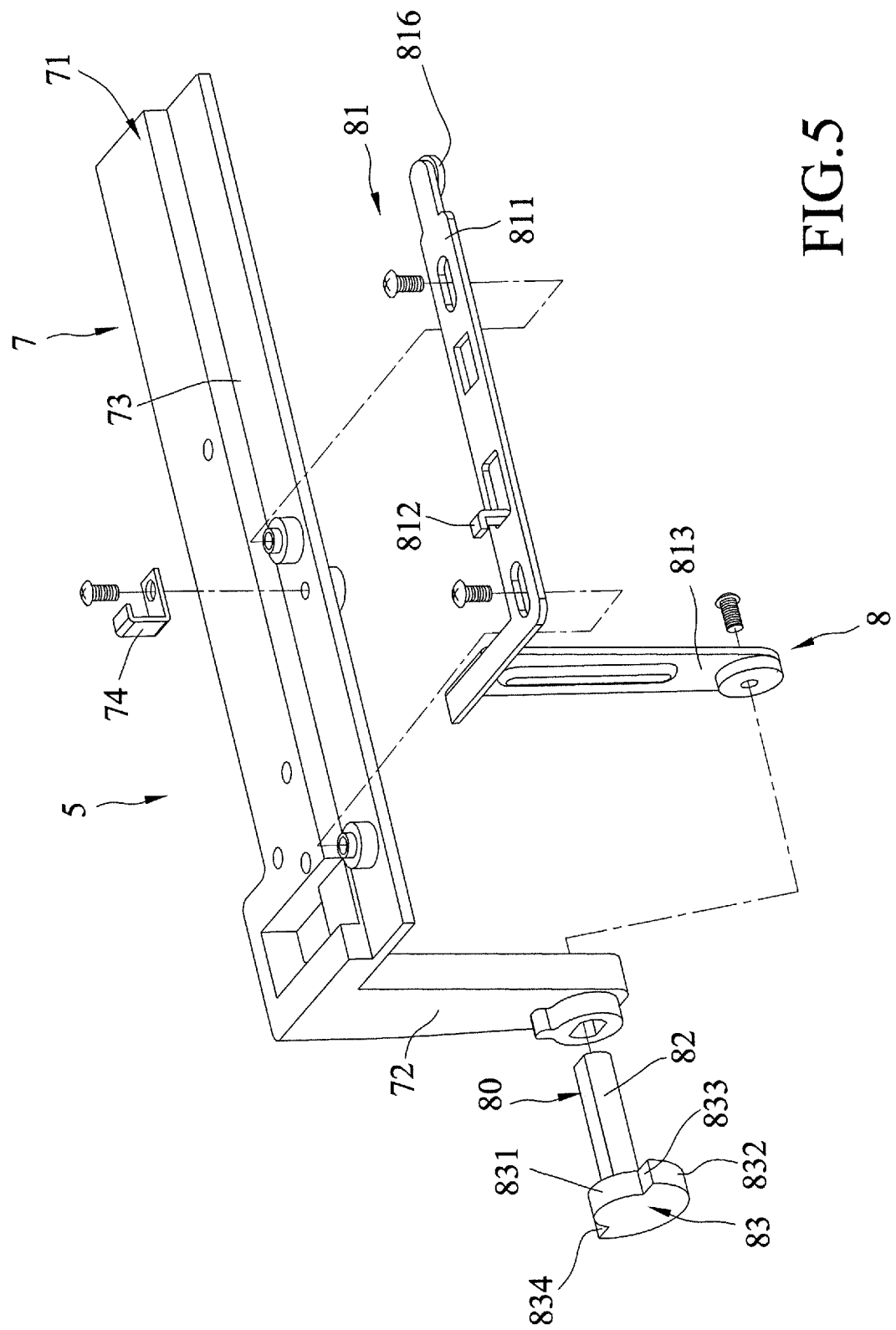
FIG. 5 is a fragmentary exploded perspective view of a positioning mechanism of the embodiment.
Figure 6:
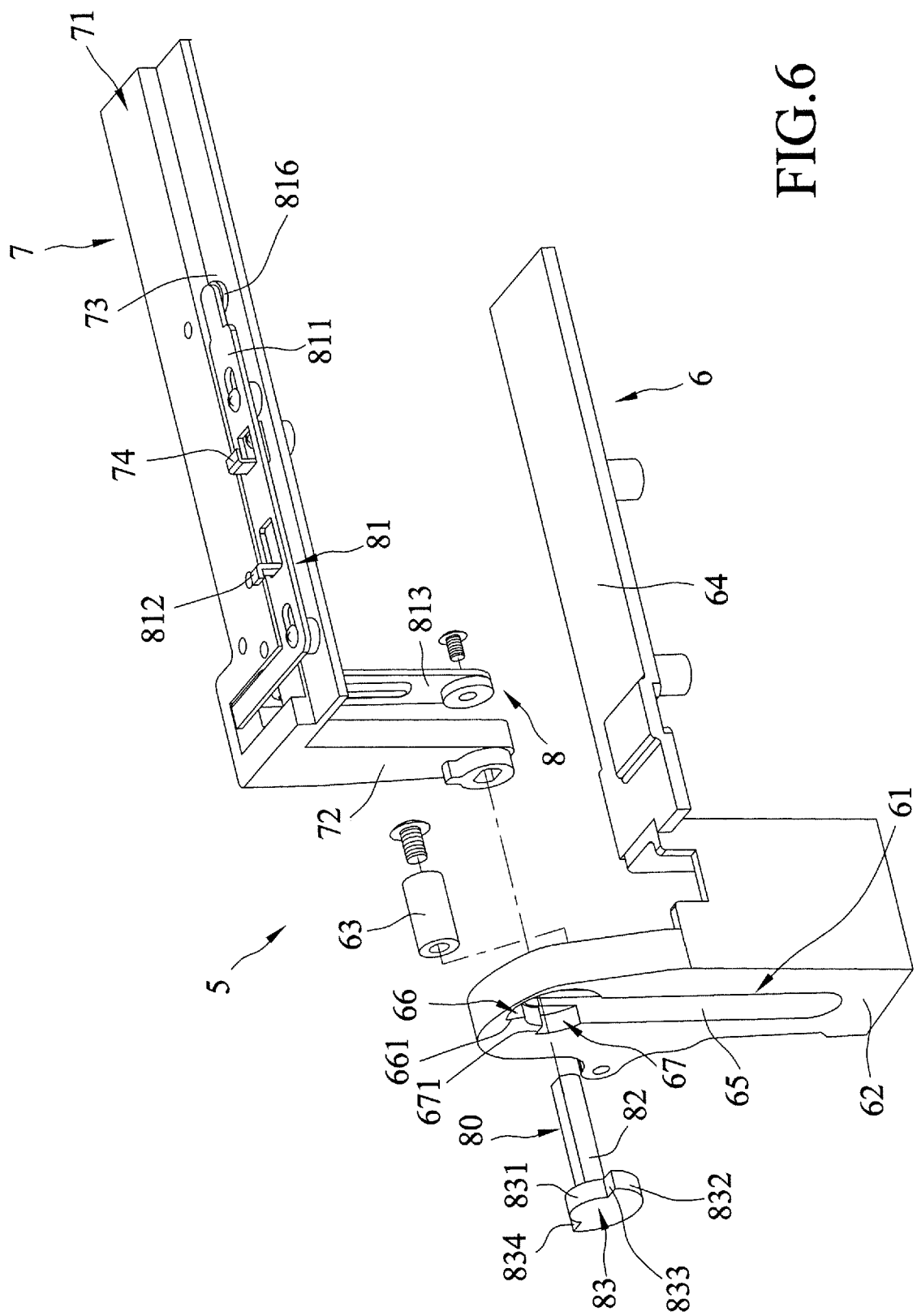
FIG. 6 is a partly exploded perspective view of the positioning mechanism.
Figure 7:
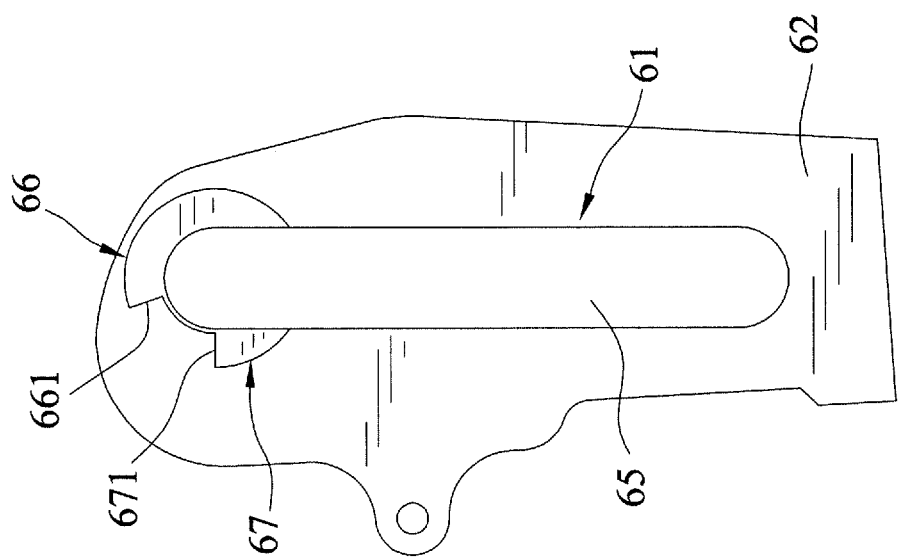
FIG. 7 is a side view of a lower coupling unit of the positioning mechanism.

Since the positioning mechanisms 5 are symmetrically arranged, only one of the positioning mechanisms 5 will be described in the following for the sake of brevity. As shown in FIGS. 5 to 7, the positioning mechanism 5 includes a lower coupling unit 6, an upper coupling member 7, and a connecting unit 8 that interconnects the lower coupling unit 6 and the upper coupling member 7.

The lower coupling unit 6 has a guiding part 62, a fixing part 64 that extends in the longitudinal direction from the guiding part 62, and an abutment pole 63 that extends in the longitudinal direction from the guiding part 62 and that is parallel to and disposed at a rear side of the fixing part 64. The fixing part 64 is connected fixedly to the lower heating plate unit 1 (see FIG. 2). The guiding part 62 is formed with a guiding hole 61 that has an elongated hole portion 65 extending in a top-bottom direction, and first and second fan-shaped hole portions 66, 67 extending from a top end of the elongation hole portion 65. The first fan-shaped hole portion 66 has a first limiting end 661. The second fan-shaped hole portion 67 has a second limiting end 671 that is adjacent to and angularly spaced apart from the first limiting end 661 of the first fan-shaped hole portion 66.

In this embodiment, the upper coupling member 7 has a connecting portion 71 that extends in the longitudinal direction and that is connected fixedly to the upper housing member 2 (see FIG. 2), and an abutment portion 72 that extends perpendicularly from an end of the connecting portion 71. The connecting portion 71 is formed with a first engaging unit 73 and is provided with a hook 74. In this embodiment, the first engaging unit 73 is formed as an elongated groove extending in the longitudinal direction.

The connecting unit 8 includes a pin 80 and an actuating member 81. The actuating member 81 has an L-shaped main portion 811 that is coupled movably to the upper coupling member 7, a hook portion 812 that projects from the main portion 811, a roller 816 that is disposed rotatably on the L-shaped main portion 811 and is disposed in the first engaging unit 73, and an extending portion 813 that extends perpendicularly from an end of the main portion 811 adjacent to the guiding hole 61 of the lower coupling unit 6, and that is parallel to the abutment portion 72 of the upper coupling member 7. The hook portion 812 and the hook 74 of the upper coupling member 7 are spaced apart from each other in the longitudinal direction and face away from each other (see FIG. 6). The pin 80 has a shaft portion 82 that extends through the guiding hole 61 of the lower coupling unit 6, and that has one end extending through and connected co-movably to a distal end of the abutment portion 72 of the upper coupling member 7, and secured to a distal end of the extending portion 813 of the actuating member 81. The pin 80 further has a positioning portion 83 connected to an opposite end of the shaft portion 82 which is opposite to the extending portion 813 of the actuating member 81 in the longitudinal direction. The positioning portion 83 of the pin 80 has a small arc surface 831, a large arc surface 832 being concentric with the small arc surface 831, a first end surface 833 interconnecting an end of the small arc surface 831 and an end of the large arc surface 832, and a second end surface 834 interconnecting an opposite end of the small arc surface 831 and an opposite end of the large arc surface 832. The positioning mechanism 5 further includes a resilient member 9 (see FIG. 8) interconnecting the hook 74 of the upper coupling member 7 and the hook portion 812 of the actuating member 81 for biasing the actuating member 81 toward the first engaging unit 73 of the upper coupling member 7. In this embodiment, the resilient member 9 is configured as a compression spring.

Referring particularly to FIGS. 2, 3, 8 and 9, the cooking device further includes an upper heating plate 3 coupled detachably to the upper housing member 2 via the positioning hook 21 of the upper housing member 2, so that the upper heating mechanism 4 is enclosed between the upper housing member 2 and the upper heating plate 3. In this embodiment, the upper heating plate 3 has a second engaging unit 31 that is configured as a protrusion formed by bending a metal bar, that engages removably the first engaging unit 73 (see FIG. 8) of the upper coupling member 7 and that abuts against the roller 816 to push the actuating member 81 away from the first engaging unit 73 against a resilient force of the resilient member 9, thereby maintaining disengagement of the positioning portion 83 of the pin 80 from the guiding hole 61 of the lower coupling unit 6. It should be noted that, since the roller 816 is rotatable, the abutment of the roller 816 of the actuating member 81 against the second engaging unit 31 facilitates the process of coupling the upper heating plate 3 to the upper housing member 2.

Referring particularly to FIGS. 1, 2, 8 and 9, when the upper heating plate 3 is coupled to the upper housing member 2 in the abovementioned manner, since the positioning portion 83 of the pin 80 is disengaged from the guiding hole 61 of the lower coupling unit 6, the upper housing member 2 is movable relative to the lower heating plate unit 1 between a covering position (see FIG. 1) to cover the lower heating plate unit 1, and an opening position (see FIG. 2) to uncover the lower heating plate unit 1. When the upper housing member 2 is at the covering position, the positioning portion 83 of the pin 80 is disengaged from the guiding hole 61 of the lower coupling unit 6.

Figure 8:
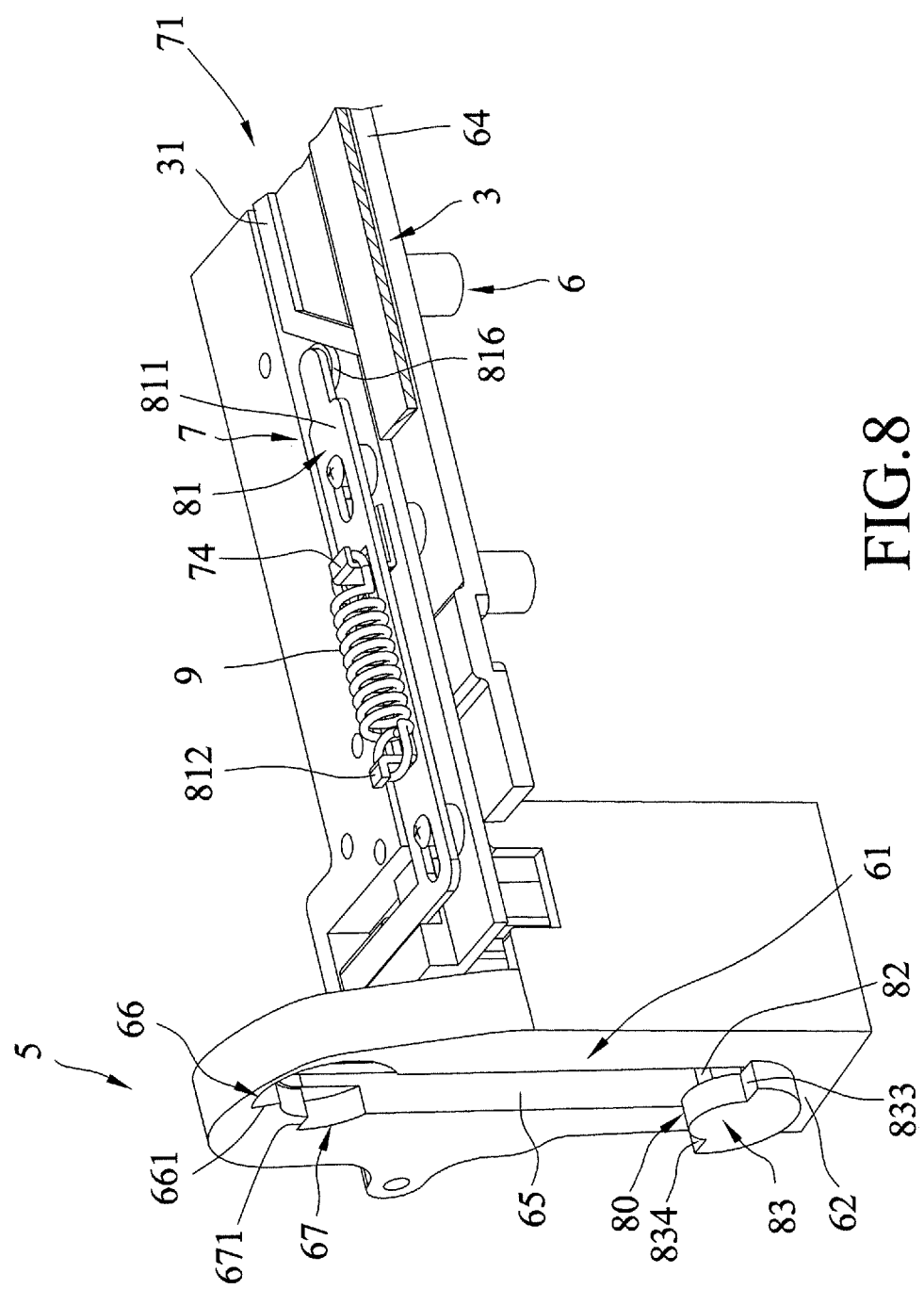
FIG. 8 is a fragmentary perspective view of the positioning mechanism and an upper heating plate when the upper housing member is at the covering position.
Figure 9:
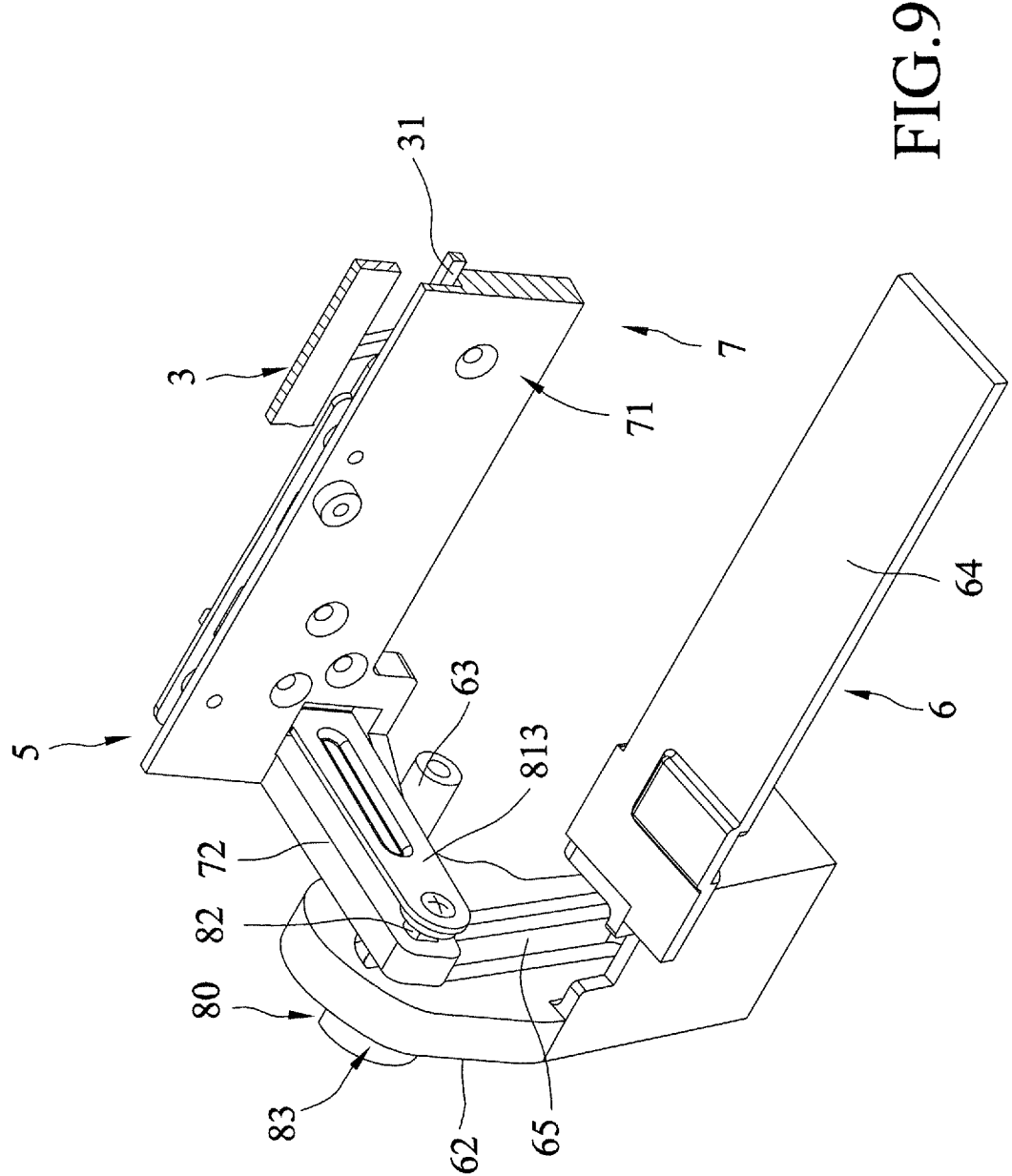
FIG. 9 is a fragmentary perspective view of the positioning mechanism and the upper heating plate when the cooking device is at the opening position.
Figure 10:
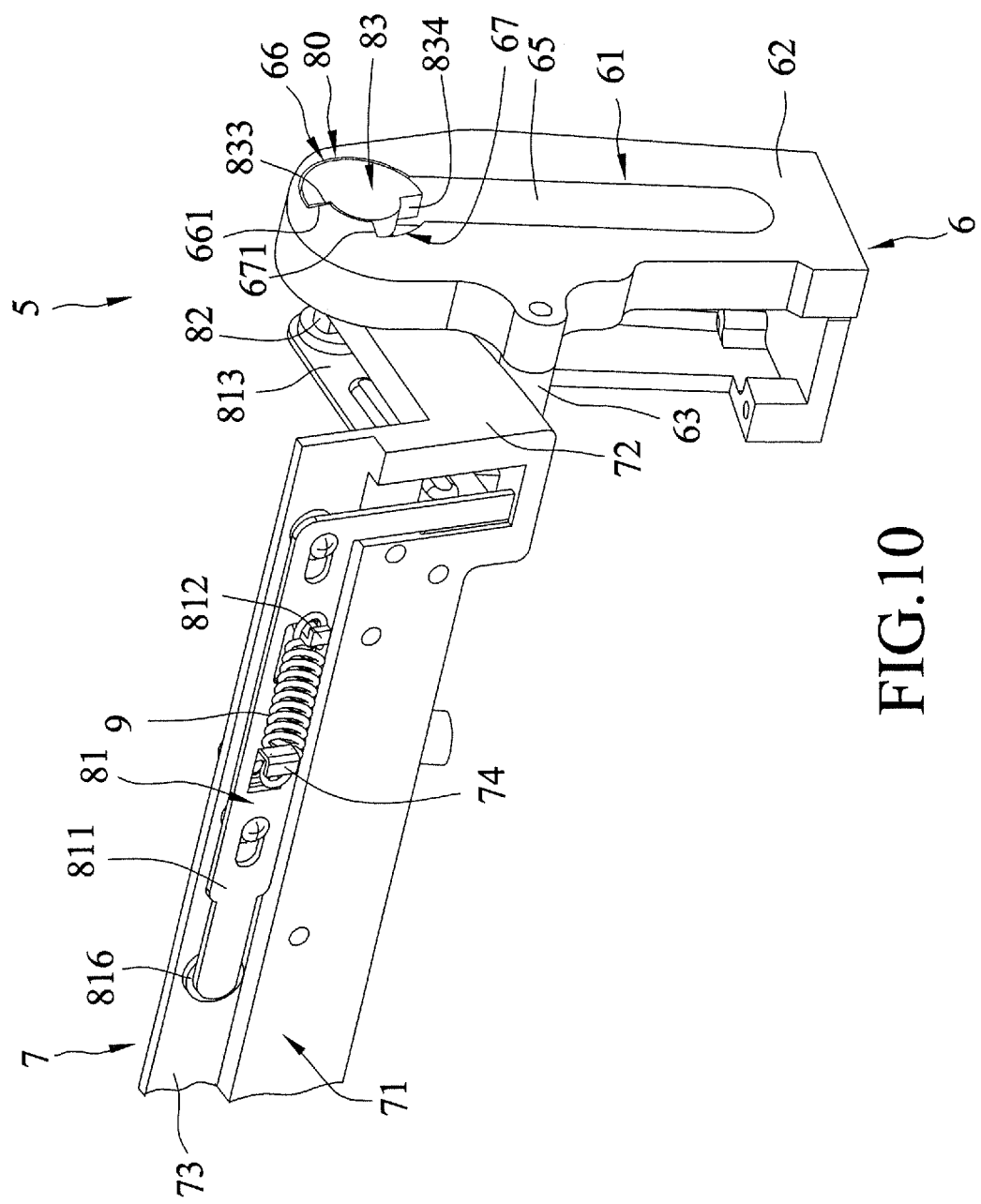
FIG. 10 is a perspective view of the positioning mechanism when the upper housing member is at a preparing position.
Figure 11:
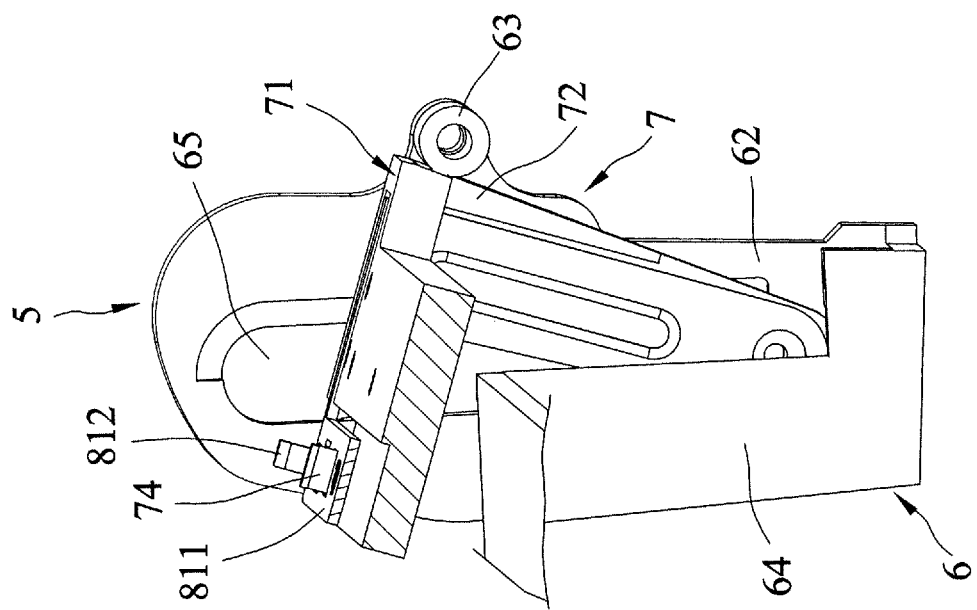
FIG. 11 is a fragmentary perspective view of the positioning mechanism, showing an abutment portion of the upper coupling member abutting against an abutment pole of the lower coupling unit.
Figure 12:
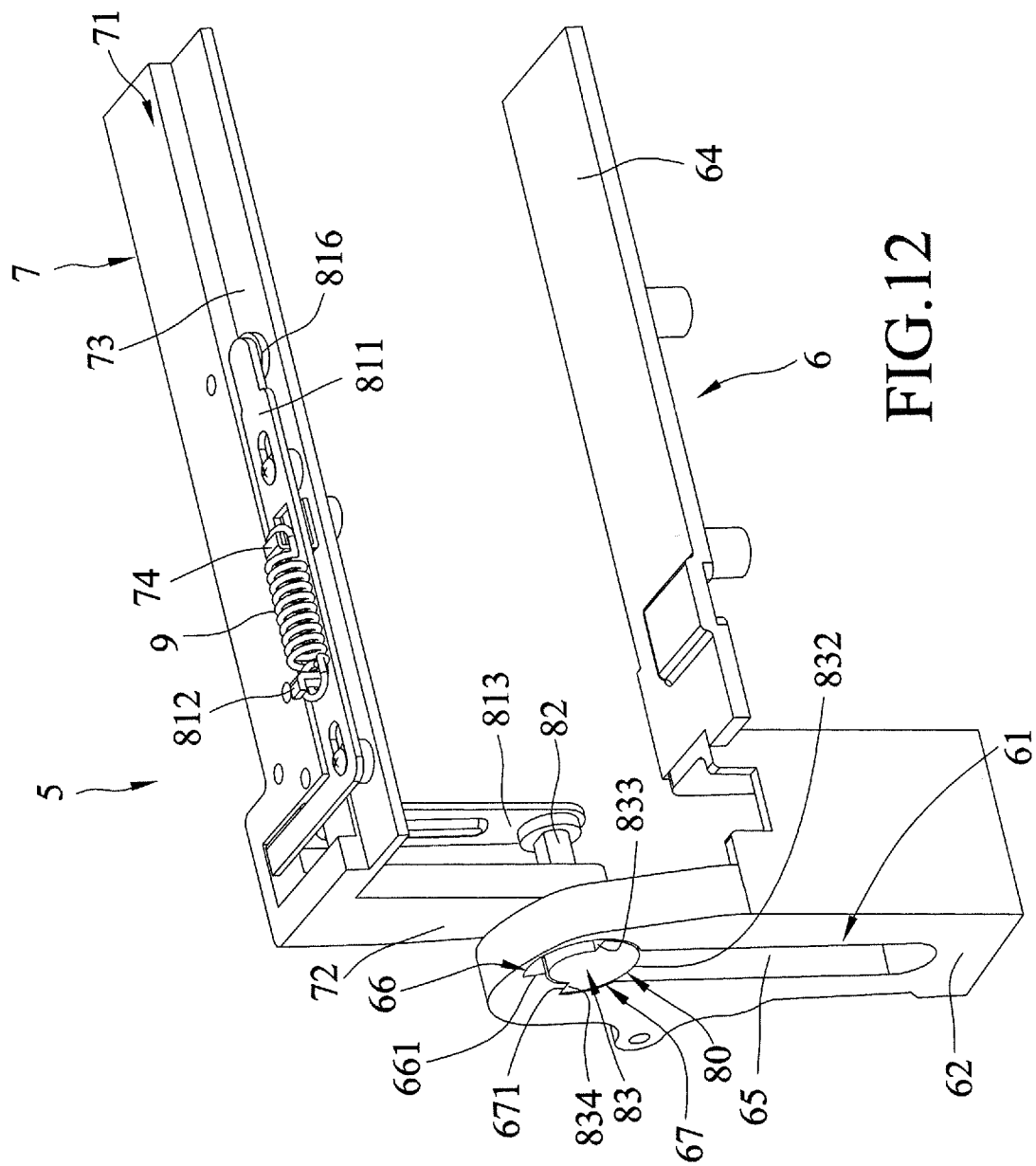
FIG. 12 is a perspective view of the positioning mechanism when the upper housing member is at the baking position.

When the upper housing member 2 is at the covering position, the shaft portion 82 of the pin 80 is disposed at a bottom end of the elongated hole portion 65 of the guiding hole 61 (see FIG. 8). Referring further to FIG. 11, during movement of the upper housing member 2 from the covering position to the opening position, the abutment portion 72 of the upper coupling member 7 abuts against the abutment pole 63 of the lower coupling unit 6, such that the distal end of the abutment portion 72 is lifted to move the shaft portion 82 of the pin 80 from the bottom end of the elongated hole portion 65 of the guiding hole 61 of the lower coupling unit 6 toward the top end of the elongated hole portion 65. The shaft portion 82 of the pin 80 is disposed at the top end of the elongated hole portion 65 when the upper housing member 2 is at the opening position (see FIG. 9).

Referring particularly to FIGS. 3, 4, 10 and 12, when the upper housing member 2 is at the opening position, removal of the upper heating plate 3 disengages the second engaging unit 31 thereof from the first engaging unit 73 of the upper coupling member 7. Since the roller 816 is rotatable, the abutment of the roller 816 of the actuating member 81 against the second engaging unit 31 facilitates the process of disengaging the upper heating plate 3 from the upper housing member 2. Consequently, the actuating member 81 is pushed resiliently toward the first engaging unit 73 by a restoring force of the resilient member 9, thereby moving the pin 80 to engage the positioning portion 83 of the pin 80 with the guiding hole 61 of the lower coupling unit 6. Afterward, the upper housing member 2 is limited to move relative to the lower heating plate unit 1 between a preparing position, where the first end surface 833 of the positioning portion 83 of the pin 80 abuts against the first limiting end 661 of the first fan-shaped hole portion 66 of the guiding hole 61 (see FIG. 10), and a baking position (see FIGS. 4 and 12), where the upper housing member 2 is parallel and spaced apart from the lower heating plate unit 1, and where the second end surface 834 of the positioning portion 83 of the pin 80 abuts against the second limiting end 671 of the second fan-shaped hole portion 67 of the guiding hole 61.

To sum up, the embodiment of the cooking device according to this invention utilizes the second engaging unit 31 of the upper heating plate 3, the two positioning mechanisms 5 and the resilient member 9, such that the upper housing member 2 is operable to be at the covering position to directly heat food placed between the lower heating plate unit 1 and the upper heating plate 3, and to be at the baking position to indirectly heat food with the upper heating mechanism 4.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cooking device comprising:
   a lower heating plate unit including a lower heating mechanism;
   an upper housing member connected to said lower heating plate unit, and being movable relative to said lower heating plate unit between a covering position to cover said lower heating plate unit, and an opening position to uncover said lower heating plate unit;
   an upper heating mechanism disposed in said upper housing member; and
   an upper heating plate coupled detachably to said upper housing member for enclosing said upper heating mechanism therebetween;
   wherein, when said upper housing member is at the opening position and when said upper heating plate is removed away from said upper housing member, movement of said upper housing member toward said lower heating plate unit is limited to a baking position, where said upper housing member is spaced apart from said lower heating plate unit;
   wherein said cooking device further comprises at least one positioning mechanism that includes
      a lower coupling unit connected fixedly to said lower heating plate unit, and formed with a guiding hole, said guiding hole having an elongated hole portion that extends in a top-bottom direction and that has an elongated opening, and
      a connecting unit including a pin that has a shaft portion extending through said guiding hole of said lower coupling unit, and a positioning portion connected to said shaft portion, said pin being configured to move along a longitudinal axis of said elongated opening of said guiding hole;
   wherein, when said upper housing member is at the covering position, said positioning portion of said pin is disengaged from said guiding hole of said lower coupling unit;
   wherein, when said upper housing member is at the baking position, said positioning portion of said pin engages said guiding hole;
   wherein said at least one positioning mechanism further includes an upper coupling member connected fixedly to said upper housing member, said shaft portion of said pin having one end connected co-movably to said upper coupling member, said positioning portion being connected to an opposite end of said shaft portion, said connecting unit further including an actuating member that is disposed linearly movably on said upper coupling member and that is connected fixedly to said end of said shaft portion of said pin;
   wherein, when said upper housing member is at the covering position, said actuating member is driven to maintain disengagement of said positioning portion of said pin from said guiding hole of said lower coupling unit; and
   wherein, when said upper housing member is at the baking position, said actuating member is driven to move said pin such that said positioning portion engages said guiding hole of said lower coupling unit.

2. The cooking device as claimed in claim 1, wherein:
   said at least one positioning mechanism further includes a resilient member interconnecting said upper coupling member and said actuating member;
   when said upper housing member is at the covering position, said actuating member is moved against a resilient force of said resilient member; and
   when said upper housing member is at the baking position, said actuating member is moved resiliently by said resilient member.

3. The cooking device as claimed in claim 2, wherein:
   said upper heating plate has an engaging unit;
   when said upper housing member is at the covering position, said upper heating plate is coupled to said upper housing member and said engaging unit pushes said actuating member against the resilient force; and
   when said upper housing member is at the baking position, said upper heating plate is removed from said upper housing member.

4. The cooking device as claimed in claim 3, wherein:
   said actuating member includes a roller disposed rotatably thereon; and
   when said upper housing member is at the covering position, said roller abuts against said engaging unit.

5. The cooking device as claimed in claim 1, wherein:
   said lower coupling unit includes an abutment pole; and
   during movement of said upper housing member from the covering position to the opening position, said upper coupling member abuts against said abutment pole such that said shaft portion of said pin is lifted.

6. The cooking device as claimed in claim 1, wherein:
   said guiding hole further has first and second fan-shaped hole portions extending from a top end of said elongated hole portion, said first fan-shaped hole portion having a first limiting end, said second fan-shaped hole portion having a second limiting end that is adjacent to and spaced apart from said first limiting end of said first fan-shaped hole portion; and
   said positioning portion of said pin having a small arc surface, a large arc surface being concentric with said small arc surface, a first end surface interconnecting an end of said small arc surface and an end of said large arc surface, and a second end surface interconnecting an opposite end of said small arc surface and an opposite end of said large arc surface.

7. The cooking device as claimed in claim 6, wherein, when said upper heating plate is coupled to said upper housing member, said shaft portion of said pin is disposed at a bottom end of said elongated hole portion of said guiding hole when said upper housing member is at the covering position, and is disposed at said top end of said elongated hole portion of said guiding hole when said upper housing member is at the opening position.

8. The cooking device as claimed in claim 7, wherein, when said upper housing member is at the opening position and said upper heating plate is removed, said upper housing member is movable relative to said lower heating plate unit between a preparing position, where said first end surface of said positioning portion of said pin abuts against said first limiting end of said first fan-shaped hole portion, and the baking position, where said second end surface of said positioning portion abuts against said second limiting end of said second fan-shaped hole portion while said upper housing member is parallel to and spaced apart from said lower heating plate unit.

9. The cooking device as claimed in claim 1, comprising two of said positioning mechanisms spaced apart from each other.

\* \* \* \* \*